April 9, 1963     L. H. MERRILL     3,084,781
CAPSULE AND TABLET INSPECTION MACHINE
Filed Nov. 15, 1960
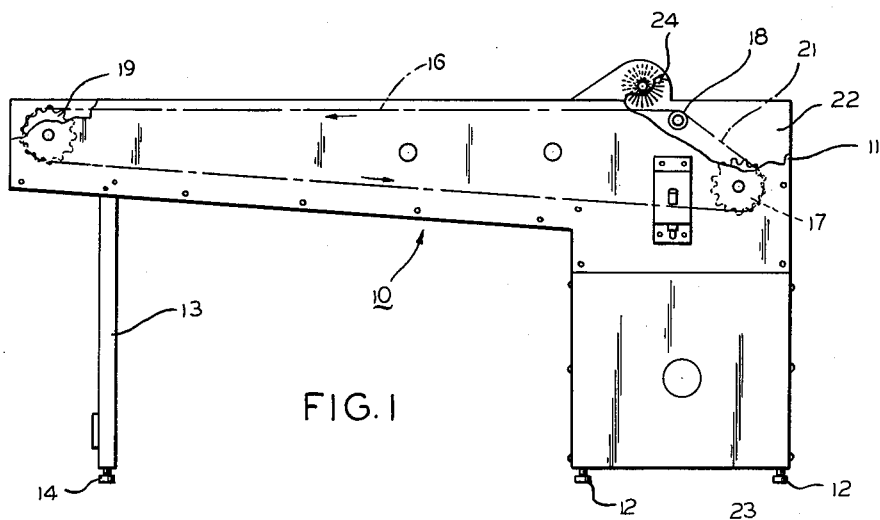
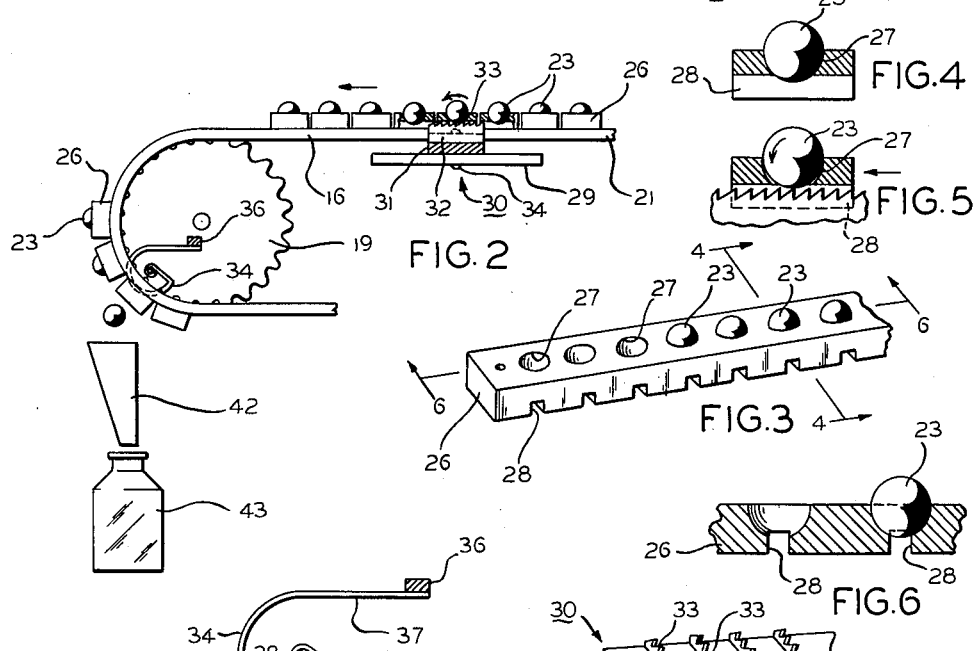
INVENTOR.
LELAND H. MERRILL
BY
ATTORNEYS United States Patent Office 3,084,781
Patented Apr. 9, 1963

3,084,781
CAPSULE AND TABLET INSPECTION MACHINE
Leland H. Merrill, 1225 W. Belmont Ave.,
Chicago 13, Ill.
Filed Nov. 15, 1960, Ser. No. 69,345
7 Claims. (Cl. 198—33)

This invention relates generally to machines for inspecting spherical or cylindrical capsules, and particularly to machines for readily inspecting such capsules while being conveyed, and for positively ejecting the inspected capsules from its conveyor after inspection.

One of the principal objects of this invention is to provide a machine for inspecting capsules of pharmaceutical preparations. Such preparations are oftentimes enclosed in a gelatin capsule having the property under humid atmospheric conditions of becoming sticky and adhering to the structure upon which it is supported.

Another object is to provide a capsule or tablet machine for transporting capsules or tablets upon an endless conveyor, and for turning the capsule through 180° while so moving to complete the inspection thereof on all sides, such machine being capable of efficient operation in spite of adverse atmospheric conditions making the coating of the capsule sticky.

Another object is to provide a capsule inspecting machine for inspecting a capsule on all sides thereof while moving on the conveying reach of an endless conveyor, and for positively ejecting the capsule at the end of the conveying reach.

Other objects and important features of the invention will be apparent from a study of the specification following taken with the drawing, which together describe and illustrate a preferred embodiment of the invention, and what is now considered to be the best mode of practicing the principles thereof. Other embodiments may be suggested to those having the benefit of the teachings herein and such other embodiments are intended to be reserved especially as they fall within the scope and spirit of the subjoined claims.

In the drawing:

FIG. 1 is an elevational view of a capsule and tablet inspecting machine constructed in accordance with the present invention;

FIG. 2 is a detailed elevational view of a portion of an endless conveyor for conveying the capsules for inspection, and for discharging the capsules at the out-by end of such conveyor, said view showing details of structure for turning the capsules through 180° to inspect all sides thereof, and for ejecting the capsules from the conveyor at the conclusion of movement thereon;

FIG. 3 is a perspective view of a capsule receiving conveyor flight, showing a number of capsules in the capsule receiving pockets formed therein;

FIG. 4 is a transverse sectional view taken along the line 4—4 of FIG. 3, looking in the direction of the arrows, showing the capsule in position in a receiving pocket on the conveyor flight;

FIG. 5 is a view similar to FIG. 4, but showing the slide moving past structure for turning the capsules through 180°, so that all sides thereof can be inspected;

FIG. 6 is a longitudinal sectional view taken along the line 6—6 of FIG. 3, looking in the direction of the arrows, showing further details of the capsule receiving pockets in the conveyor flight seen in FIG. 3;

FIG. 7 is a perspective view of structure cooperating with the capsule receiving pockets of the conveyor flight seen in FIG. 3, and for turning the capsule through 180° to complete the inspection of all sides thereof; and FIG. 8 is a detailed elevational view of structure cooperating with the capsule receiving flights in their discharging position, to insure the discharge of the capsules from such flight.

Referring now to the drawing, the improved capsule and tablet machine according to the present invention is referred to by the reference numeral 10, and includes laterally spaced frame members 11 which are supported upon feet 12. A pair of vertical struts 13 extended downward from the frame members 11 near the outby or discharge end of the machine 10 and also have feet 14, the feet 12 and 14 being adjustable to take care of any irregularities in the surface upon which the machine 10 is supported.

The spaced frame members 11 support an endless conveyor referred to generally by the reference numeral 16 and are reeved around laterally spaced driving pulleys 17, idler pulleys 18 and outby or discharge pulleys or sprockets 19, see also FIG. 2. A suitable motor, not shown, is provided for driving the pulleys 17. The endless conveyor 16 has a conveying reach 21 which moves in a hopper 22 defined by the laterally spaced frame members 11. The hopper 22 contains capsules 23 as seen in the several views, which are picked up by the conveying reach 21, and moves past a brush 24 turning in a direction opposed to the direction of movement of the conveyor reach 21 and in such a fashion as to sweep excess capsules from the conveying reach 21.

The endless conveyor 16 may be of any suitable type, but for purposes of description at this point, it includes transversely extending flights 26 having a plurality of capsule receiving pockets 27 spaced therealong, as seen more clearly in FIG. 3. For purposes of description in this application the pockets are shown as being adapted to hold spherical capsules 23, but it is entirely within the purview of the invention to have the pockets generally semi-cylindrical in cross section so as to accommodate the cylindrical capsule if desired.

The recesses 27 in the flights 26 are each adapted to receive an individual capsule 23 which moved with the conveying reach 21 of the endless conveyor 16 to the left as seen in FIG. 1. After capsules 23 are distributed by the brush 24 on the conveyor reach 21 they are in position for inspection by the operator of the machine 10, and structure is provided while the capsules move on the flight 26 turning the same through 180° so that all sides of the capsule can be inspected.

It has been known that capsules formed of gelatin tend to soften or become sticky when the humidity is excessively high, and the structure according to the present invention makes it possible to handle gelatin capsules expeditiously, at the same time enabling the capsule to be turned in such a fashion that all sides thereof can be inspected. Accordingly, and as seen in FIG. 2, structure is provided for turning the capsule through 180° to complete the inspection of all sides thereof.

Referring now to FIGS. 4 and 5, each of the recesses 27 for holding the capsule 23 is intersected by a slot 28 extending in the direction of movement of the flights 26. Each of the slots 28 intersects the recess 27 for the capsule 23 as seen in FIG. 4. As the capsule moves with the flight 26 to the outby end of the conveyor 16, it moves past structure referred to by the reference numeral 30 for turning the capsule through 180°. Such structure comprises a support frame 29 extending between the spaced frames 11 and beneath the conveying reach 21 and supported by the frames 11 in any convenient manner. The frame 29 supports a slotted block 31 each of the slots of the blocks receiving a narrow blade 32 having a toothed upper edge 33. The block 31 can be held to the support frame 29 by means of suitable bolts 34.

As the capsules contact the teeth 33, they are turned in their recesses 27 as shown in FIG. 5. It will be seen that movement of the capsule 23 past the structure 30 causes them to be inspected on all sides. The teeth 33 are effective to grip the capsules slightly to effect such turning.

After the capsules 23 have been turned through 180° by the structure thus described, they move to the outby end of the conveyor 16 where they are discharged. Structure is provided for insuring that a sticky capsule is discharged from its recess 27 in the flight 26, and to this end a plurality of ejecting fingers 34 are mounted on a bar 36 extending between the laterally spaced sprockets 19 and supported by the frame members in any convenient manner. The fingers 34 include a generally horizontally extending limb 37 and a generally semi-circular bight 38 which terminate in a radial extension 39 which is wrapped as seen in FIG. 8 about a thin bar 41 extending laterally and between the frame members 11.

The capsules 23 which may stick in the recesses 27 as the conveyor 16 is reversed about the sprocket 19, are caused to be ejected from the recesses by reason of the U-shaped bight extending into the slot 28 in such a fashion as to contact the bottom of the capsules 23.

The capsules which are thus ejected fall into a funnel shaped hopper 42 and into any convenient receptacle 43.

From the description foregoing it is believed evident that there has been provided a new and useful improvement in machines for inspecting capsules. The machine according to the present invention is especially advantageous in gelatin coated capsules which become sticky during conditions of high humidity. Moreover, the machine is especially useful in that but a simple structure is provided for turning the capsule through 180°, so that they can be readily inspected.

Further because of the symmetrical design, i.e., all capsules being substantially evenly spaced apart longitudinally and laterally, on the moving conveyor, the eyes of the inspectors do not tire readily as in prior inspection units. In prior inspection units the capsules are loosely placed on a moving belt surface and as should be obvious the capsules form a helter-skelter or random pattern thereon, and experience has proven the inspection is very poor due to the strain on the eyes.

While the invention has been described in terms of a preferred embodiment thereof, its scope is intended to be limited only by the claims here appended.

I claim:

1. In a machine for facilitating the inspection of capsules, a frame, an endless conveyor movable along said frame including material receiving flights movable in a capsule conveying reach and a return reach, means for feeding capsules to said material receiving flights, each of said flights extending transversely to the direction of motion of said conveying reach and having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, means for rotating each capsule through an angle of 180° whereby the capsule can be inspected on all sides, and fixed means intersecting said slot for ejecting the inspected capsules from said capsule receiving pocket in said conveying reach.

2. In a machine for facilitating the inspection of capsules, a frame, an endless conveyor movable along said frame including material receiving flights movable in a capsule conveying reach and a return reach, means for feeding capsules to said material receiving flights, each of said flights extending transversely to the direction of motion of said conveying reach and having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, and means for rotating each capsule through an angle of 180° whereby the capsule can be inspected on all sides comprising a stationary toothed member extending in said slot and arranged to engage said capsules.

3. In a machine for facilitating the inspection of capsules, a frame, an endless conveyor movable along said frame including material receiving flights movable in a capsule conveying reach and a return reach, means for feeding capsules to said material receiving flights, each of said flights extending transversely to the direction of motion of said conveying reach and having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, means for rotating each capsule through an angle of 180° whereby the capsule can be inspected on all sides comprising a fixed toothed member extending in said slots and arranged to engage said capsules, and stationary means for ejecting the inspected capsules from said capsule receiving pocket comprising a resilient finger adapted to enter said slot where said conveyor is reversing its direction at said return reach.

4. In a machine for facilitating the inspection of capsules, a frame, an endless conveyor movable along said frame including material receiving flights movable in a capsule conveying reach and a return reach, means for feeding capsules to said material receiving flights, each of said flights extending transversely to the direction of motion of said conveying reach and having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, stationary means for rotating each capsule through an angle of 180° whereby the capsule can be inspected on all sides, and means for ejecting the inspected capsules from said capsule pocket comprising a resilient finger adapted to enter said slot and contacting said capsule when said conveyor is reversing its direction at said return reach.

5. In a machine for facilitating the inspection of capsules, a frame, an endless conveyor movable along said frame including material receiving flights movable in a capsule conveying reach and a return reach, means for feeding capsules to said material receiving flights, each of said flights extending transversely to the direction of motion of said conveying reach and having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, stationary means for rotating each capsule through an angle of 180° whereby the capsule can be inspected on all sides, and means for ejecting the inspected capsules from said capsule pocket, comprising means entering said slot and contacting said capsule when said conveyor is reversing its direction at said return reach.

6. In a machine for facilitating the inspection of capsules, a frame, an endless conveyor movable along said frame including material receiving flights movable in a capsule conveying reach and a return reach, each of said flights having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, stationary means for rotating each capsule through an angle of 180° whereby the capsule can be inspected on all sides, and means for ejecting the inspected capsules from said capsule pocket .

7. In a machine for facilitating the inspection of capsules, a frame, an endless conveyor movable along said frame including material receiving flights movable in a capsule conveying reach and a return reach, each of said flights having a plurality of capsule receiving pockets spaced therealong, each of said pockets being generally semi-circular in cross-section in a plane parallel to flight movement, a slot at each capsule receiving pocket, said slot extending in the direction of flight movement and intersecting each capsule receiving pocket, and stationary means for rotating each capsule through an angle of 180° whereby the capsule can be inspected on all sides.

References Cited in the file of this patent

UNITED STATES PATENTS

| | | |
|---|---|---|
| 2,054,247 | Dilger | Sept. 15, 1936 |
| 2,711,813 | Jordan | June 28, 1955 |
| 2,732,987 | Moore | Jan. 31, 1956 |
| 2,788,113 | Waal | Apr. 9, 1957 |
| 2,828,788 | Ashlock | Apr. 1, 1958 |